May 8, 1956 L. H. REAGAN 2,744,964

TOLL SWITCHBOARD

Filed Jan. 16, 1953 7 Sheets-Sheet 1

INVENTOR.
LEON H. REAGAN
BY J. Warren Whitesel
ATTORNEY

INVENTOR.
LEON H. REAGAN
BY J. Warren Whitesel
ATTORNEY

May 8, 1956 L. H. REAGAN 2,744,964

TOLL SWITCHBOARD

Filed Jan. 16, 1953 7 Sheets-Sheet 3

INVENTOR.
LEON H. REAGAN

BY J. Warren Whitesel

ATTORNEY

DIAL CIRCUIT

INVENTOR.
LEON H. REAGAN
BY [signature]
ATTORNEY

INVENTOR.
LEON H. REAGAN
BY [signature]
ATTORNEY

May 8, 1956 L. H. REAGAN 2,744,964

TOLL SWITCHBOARD

Filed Jan. 16, 1953 7 Sheets-Sheet 6

OPERATOR'S CIRCUIT

INVENTOR.
LEON H. REAGAN
BY J. Warren Whitesel
ATTORNEY

May 8, 1956 L. H. REAGAN 2,744,964

TOLL SWITCHBOARD

Filed Jan. 16, 1953 7 Sheets-Sheet 7

INVENTOR.
LEON H. REAGAN
BY J. Warren Whitesel
ATTORNEY 2,744,964
Patented May 8, 1956

2,744,964

TOLL SWITCHBOARD

Leon H. Reagan, Richland, Wash., assignor, by mesne assignments, to General Dynamics Corporation, a corporation of Delaware Application January 16, 1953, Serial No. 331,627

17 Claims. (Cl. 179—27)

This invention relates to an electro-mechanical telephone system and more specifically to an operator's toll board. This invention is adapted to cooperate with a keysender of type shown in my copending application Serial Number 311,845, filed September 27, 1952, now Patent 2,730,568, both this and the subject application being assigned to the same assignee.

Electro-mechanical telephone systems, as they are known today, often require both a human operator and a plurality of directively controlled switches to extend a connection from a calling line to a called line. In such a system, the calling subscriber initiates a call and his line is extended to an operator position by any suitable means. For example, he may be on a direct line terminating at a switchboard jack or there may be directively controlled switches wherein a particular digit "zero" for example, is dialed to seize an operator.

The operator may answer the call by any suitable equipment such as a plug and jack, cord circuit, position circuit, and the like. Usually the operator has a plurality of cord circuits, any one of which may be made individual to a particular call. A second group of circuits are common to all of the cord circuits; therefore, when she answers the call, it is necessary for her to associate this common equipment with the particular cord circuit that is individual to the call. Following this, the operator transmits switch directing signals over the calling or front plug of her cord circuit for setting suitable telephone equipment to seize a called subscriber. She may use either a key sender or a dial to transmit these signals.

Systems of this type are subject to many undesirable features which have come to be accepted as characteristic or inherent to the equipment which must be used. For example, during the various stages through which a telephone call progresses, the circuit is subject to unbalances, sparking or the like, thereby creating undue noise in the operator's headset. This is both fatiguing and annoying. In the past, an operator had to perform certain functions in a certain sequence; for example, she could not return her talk key to normal until the completion of all of her operations. This reduces operator flexibility. Furthermore, an operator has not been provided with an option for positively preventing while still permitting the interconnection of conversation paths in the operator's circuit. This invention, on the other hand, is arranged to positively prevent the interconnection of two cords while providing an operator option for overriding this prevention means thereby interconnecting cord circuits.

One object of this invention is to provide a new and improved tool switchboard.

A second object of this invention is to eliminate or reduce extraneous noises occurring in the operator's headset.

Another object of this invention is to increase the efficiency of the operator's headset by providing proper anti-sidetone balance at all times without regard as to whether a circuit is plugged into a trunk or not.

Still another object of this invention is to provide a positive interlock whereby the operator is prevented from interconnecting two conversation circuits.

A further object of this invention is providing means for giving the operator an option permitting the interconnection of two circuits upon the performance of certain definite acts.

A still further object of this invention is in providing increased operator flexibility by reducing the number of operations which must be performed in a given sequence.

Yet another object is to prevent the simultaneous association of the dial circuit with two or more cord circuits.

These and still other objects will be more apparent by making reference to the accompanying drawing in which.

Figure 3:
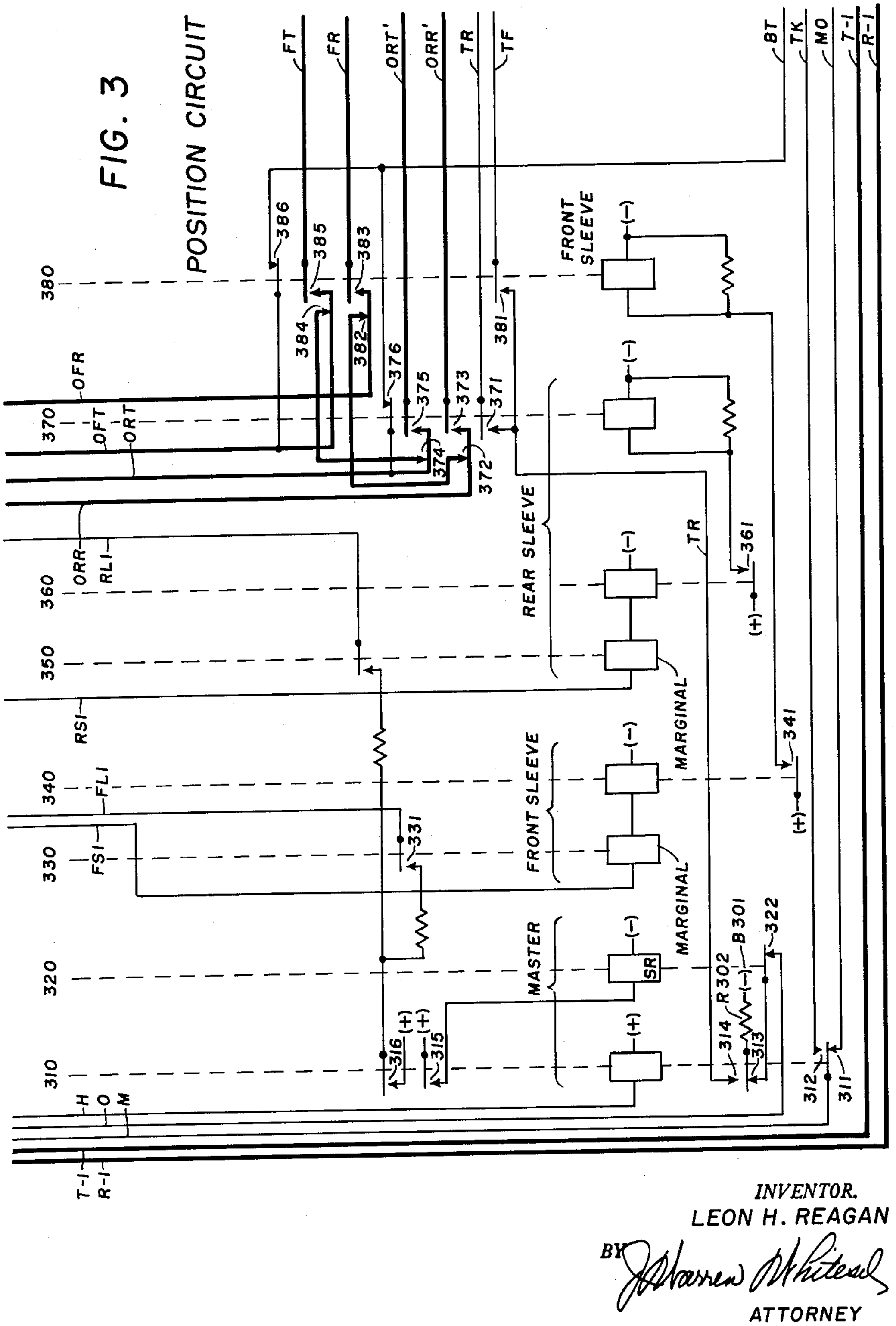
Figure 5:
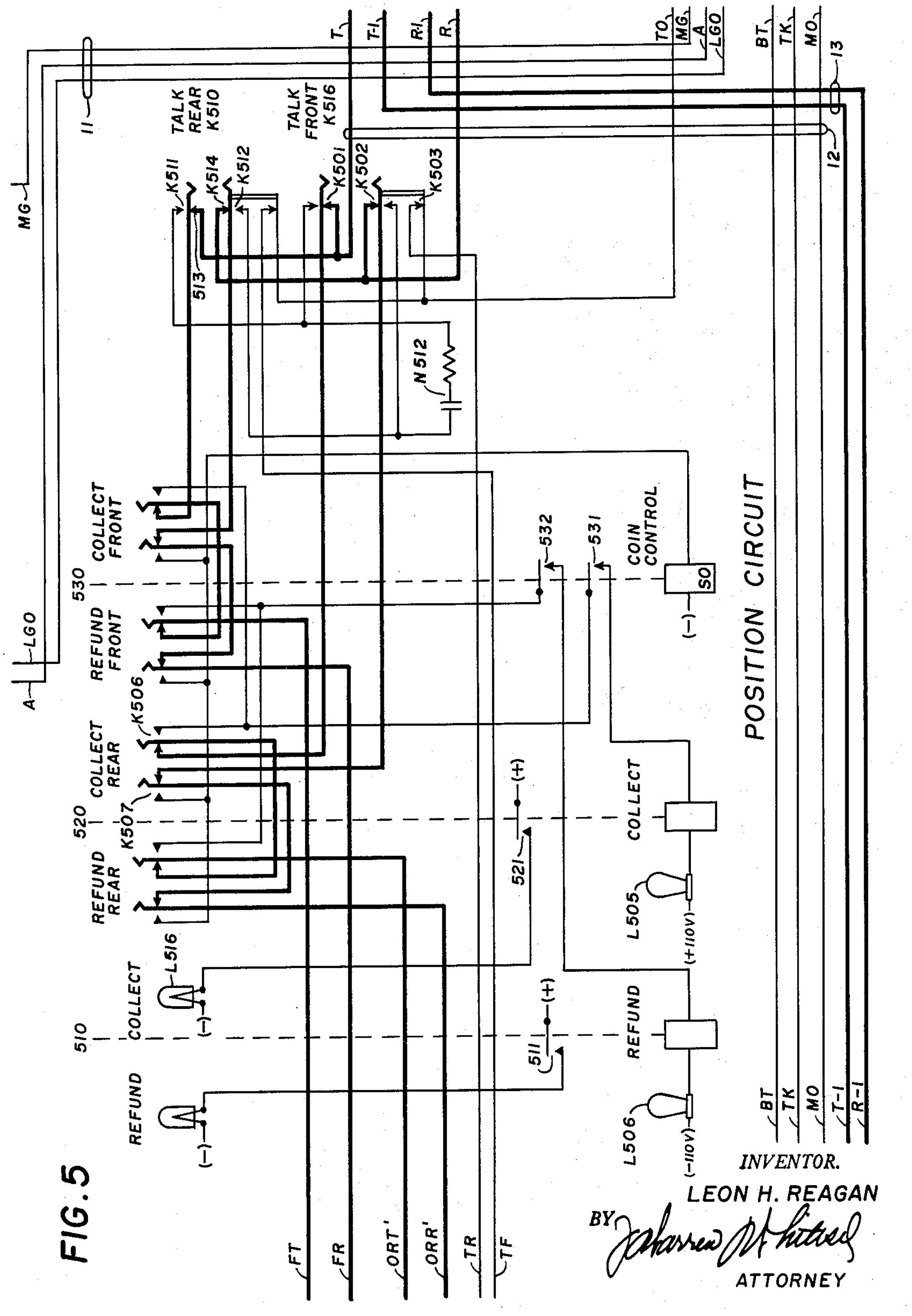

Figs. 3 and 5, when properly joined, illustrate a position circuit.

Figure 4:
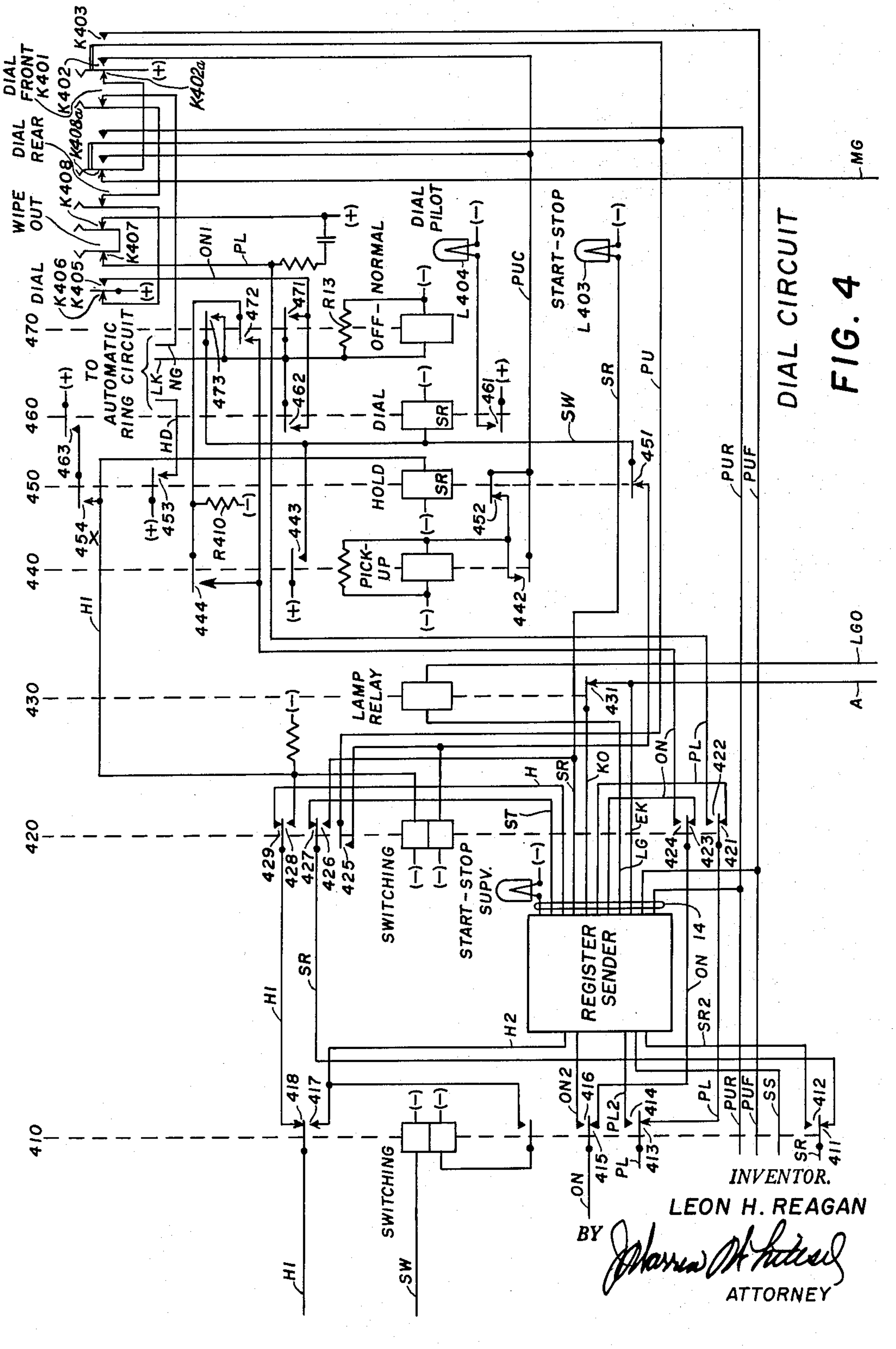

Fig. 4 gives details of a dial circuit.

Figure 6:
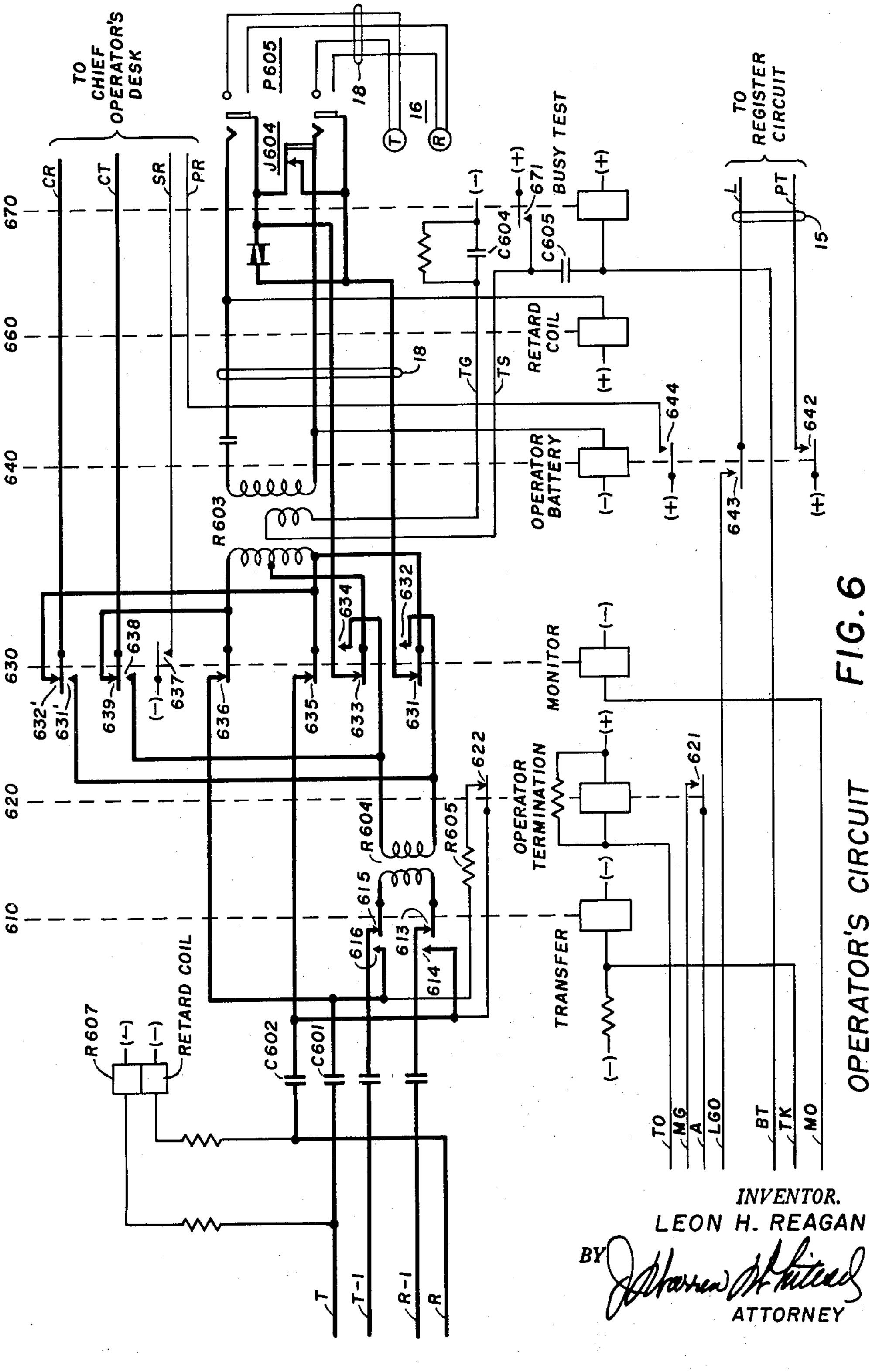

Fig. 6 is an operator circuit.

Figures 1, 7:
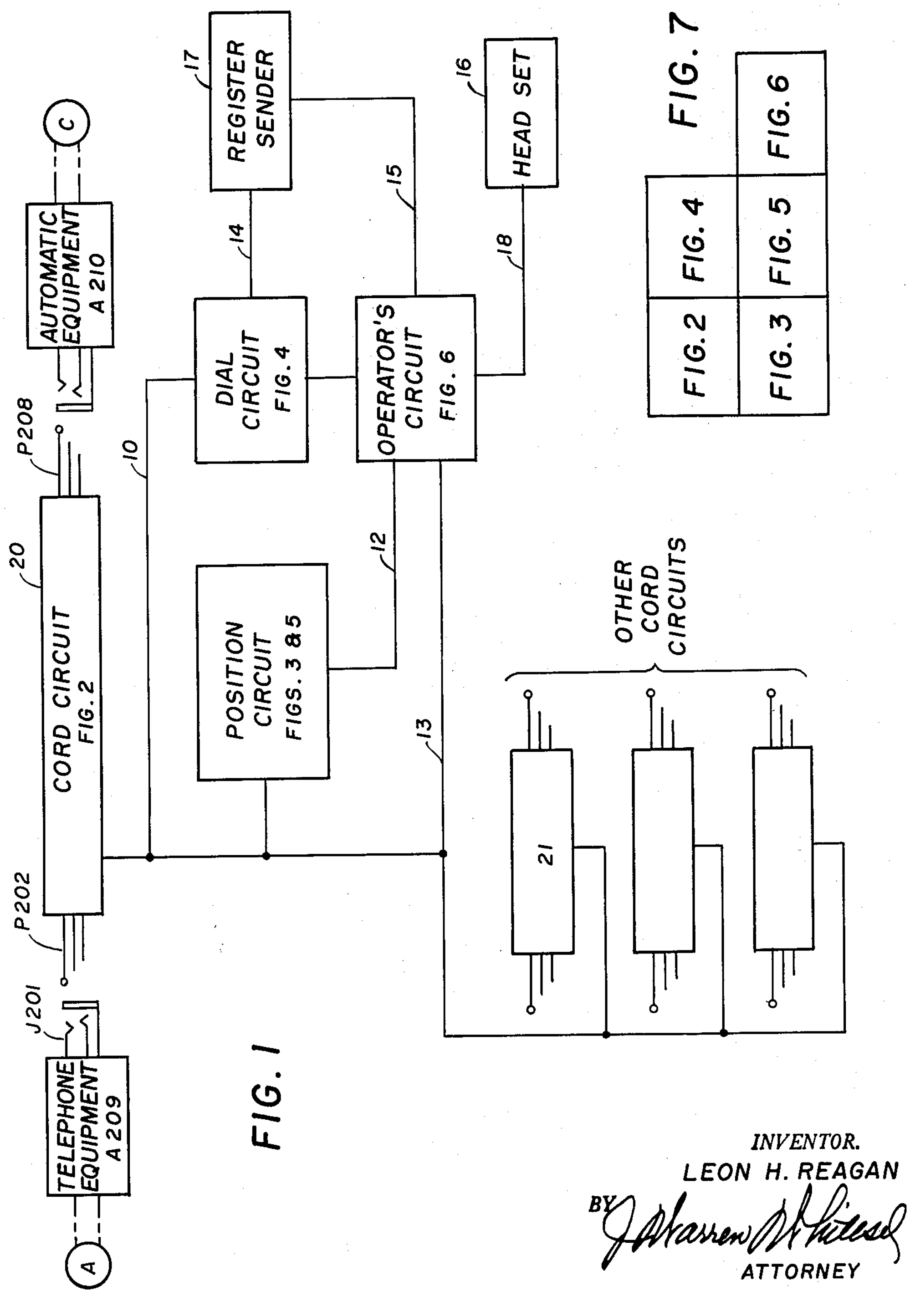
Fig. 1 shows a block diagram of how the remaining figures interconnect to form a telephone system.

Fig. 7 shows the manner in which Figs. 2–6 should be laid out to provide a complete and operable circuit.

Figure 8:
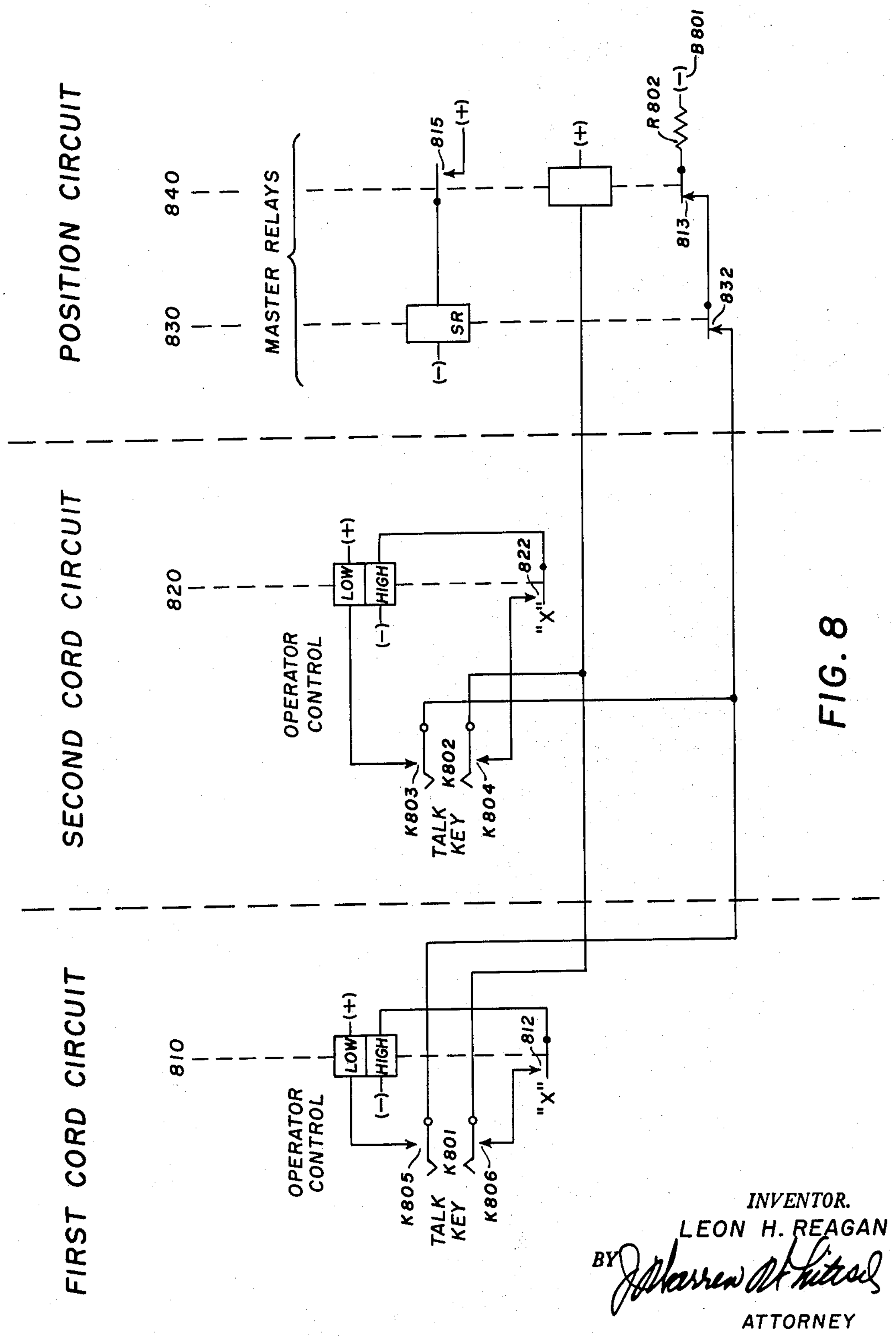

Fig. 8 illustrates the manner in which two cord circuits are prevented from seizing common equipment simultaneously.

The circuits of Figs. 2–6 and 8 illustrate the battery connections by conventional symbols. As is the case in most telephone circuits, the positive terminal is described as connected with ground. For this reason, I refer to the negative pole as (—) battery and the positive pole as grounded (+). It should be understood that this condition could be reversed or that any other well-known power source may be used without changing my invention.

Fig. 1 schematically illustrates the equipment which is shown in detail in Figs. 2–6. In this figure it is assumed that a calling party A seizes an operator's position, for example at jack J201, by any suitable telephone equipment A209, responsive to which an operator interconnects plug P202 and jack J201 thereby making the cord circuit (Fig. 2) individual to calling subscriber A. Means is provided for connecting the cord circuit with common equipment on an individual basis, thus eliminating possible interferences from the other cord circuits. For example, the operator may throw a talk key in the cord circuit thereby seizing the position circuit of Figs. 3 and 5. Responsive to the actuation of this talk key, a circuit may be completed over cable 12 by which the operator circuit in Fig. 6 is conditioned to extend a talking path to the operator's headset 16. Upon conversing with calling party A, the operator learns the destination of the call which is assumed to be to subscriber C. Following this, she may either use a dial in Fig. 4 or a register sender 17 for extending switch control signals over cable 10, through the cord circuit and plug P208 to automatic equipment A210, where conventional equipment is set to seize called subscriber C.

It is though that a more complete understanding of this invention is facilitated by a detailed description of Figs. 2–6. These figures fit together in the manner shown in Fig. 7 and correspond to the showing of Fig. 1. For example, cable 10 is shown near the lower right of Fig. 2, cables 12 and 13 are shown in Fig. 5, cable 11 interconnects Figs. 4 and 6, via Fig. 5, cable 18 extends from the operator circuit to her headset which is shown near the right center of Fig. 6, cable 14 is shown in Fig. 4 as extending to the register sender, cable 15 also connects with the key circuit and it is shown near the lower right portion of Fig. 6. As to the register, sender and keyset, reference is made to my copending application, Serial Number 311,845, filed September 27, 1952, now Patent 2,730,568, for a complete disclosure of such equipment.

*Operator takes position*

The operator's circuit, Fig. 6, is common to many cord circuits and is adapted to complete the talking paths from operator's headset 16 to either calling subscriber A or called subscriber C. However, before the operator can converse with any subscribers, she must "take position" or stated otherwise, she must prepare the talking path of Fig. 6. First, plug P605 is connected with jack J604, thereby completing a talking path between her headset 16 and induction coil R603 via cable 18. Responsive thereto, operator battery relay 640 operates from (−) battery through the winding of relay 640, cable 18 through the transmitter portion of operator's headset 16 and back over cable 18 through the winding of retard coil 660 to a grounded (+). This circuit also furnishes talking battery to headset 16. Operator battery relay 640 closes contact 642 and completes a marking over the PT conductor to a position take relay in the register control circuit of a key sender is provided. Relay 640 also closes contacts 644 to extend a signal to the chief operator's desk indicative of the fact that the operator has taken position. The receiver portion of operator's headset 16 is now connected over cable 18 and through contacts 631 and 633 to the secondary winding of inductance coil R603.

*Operator answers call*

Figure 2:
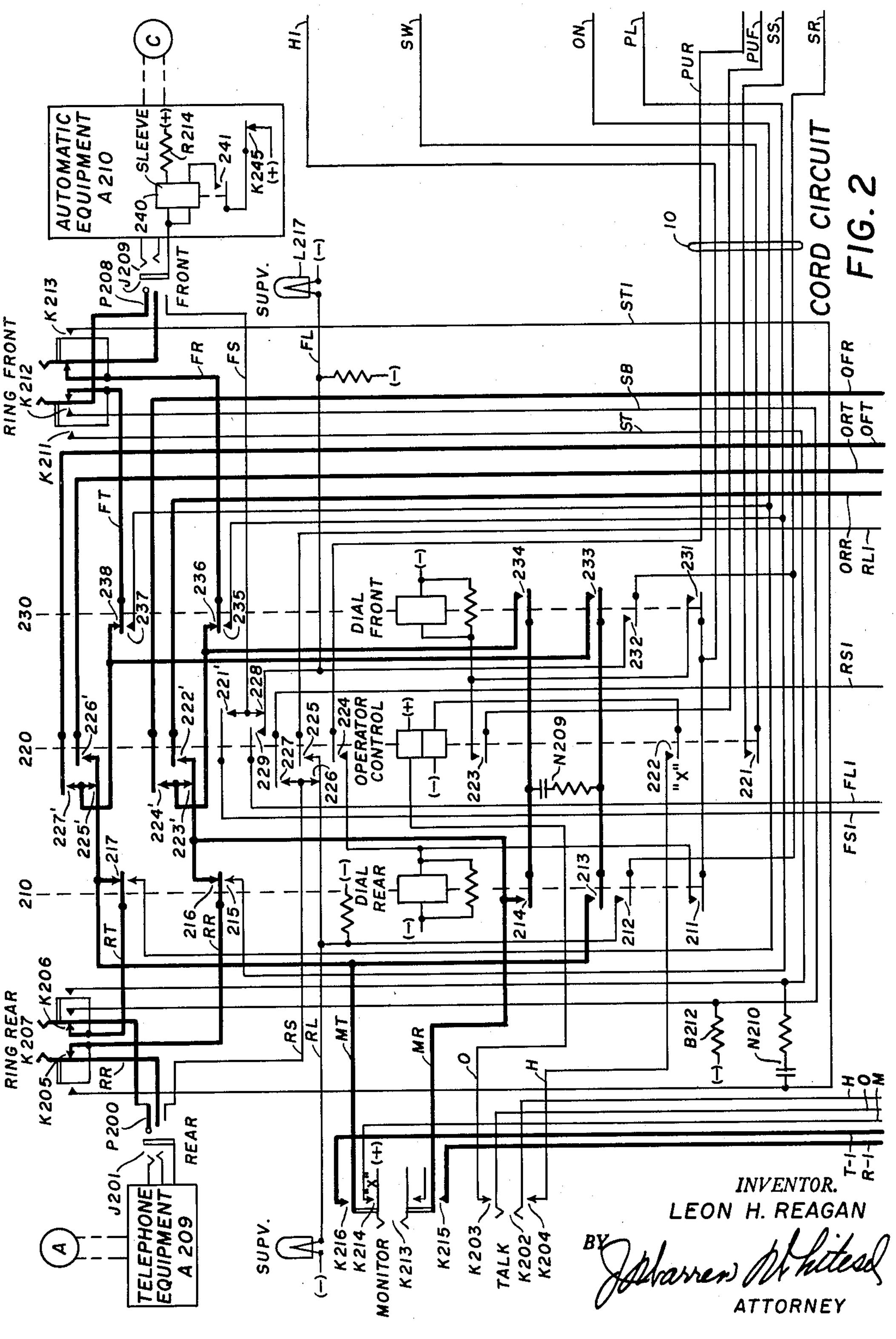
Fig. 2 shows a cord circuit.

To illustrate the invention, a typical call will be described. It is assumed that subscriber A is calling subscriber C and that the cord circuit of Fig. 2 is used to complete the call. More specifically, to answer a call, the operator first inserts the plug associated with the rear cord circuit into the jack of the calling line. That is plug P200 is connected with jack J201. It should be understood that a plurality of cord circuits may utilize the common equipment shown in Figs. 3–6; therefore a device such as talk key K202 is necessary for making the cord circuit individual to the common equipment.

The operator must now associate her common equipment with the cord circuit of Fig. 2. To do this, she operates talk key K202 thereby completing a circuit to operaotr control relay 220 which operates over the circuit from grounded (+) through the winding of relay 220, operated contacts K203, conductor O, contacts 322 to (−) battery B301 by way of contacts 313 and resistor R302. Operator control relay 220 operates half way due to the resistance characteristics selected for element R302 to close its preliminary or "X" contacts 222, thereby completing a circuit for fully energizing relay 220 in series with master relay 310, the circuit being traced from (−) battery to the lower winding of operator control relay 220, contacts 222, operated contacts K204, the H conductor and through the windings of master relay 310 to grounded (+). Relay 310 operates to prepare the operator's circuit as will be explained later. It also completes a circuit for a second master relay 320 which operates but has no function at this time. Contacts 221 complete a signal path from the keysender to switching relay 410 if dual sender circuits are used. At contacts 223′ and 225′, operator control relay 220 breaks contact between rear ring and tip conductors RR and RT and front ring and tip conductors FR and FT; instead, a circuit is completed by way of contacts 222′ from rear ring conductor RR to operator's rear ring conductor ORR and at contacts 226′ to operator's rear tip conductor ORT. At contacts 224′ and 227′ a connection is completed between the front ring and tip conductors FR and FT and operator's front ring and tip conductors OFR and OFT.

Relay 220 also is effective for opening the circuit over which supervision usually is extended. This is so that the sleeve conductors may be used to control the operation of certain circuits. For example, rear sleeve lead RS is disconnected from rear lamp lead RL at contact 226 while a similar front connection is broken at contact 228. Meanwhile, a circuit is completed at contacts 227 for operating rear sleeve relay 360. This circuit may be traced from plug P200 over rear sleeve conductor RS, through contacts 227 over conductor RS1 and through relays 350 and 360 to (−) battery. Relay 360 operates contacts 361 which energizes relay 370. The resistors around the windings of relays 370 and 380 provide for spark suppression.

In a similar manner, contacts 228 open to disconnect supervisory lamp L217 from front sleeve FS. Contacts 221′ close a circuit for operating front sleeve relay 340 which in turn closes its contacts 341 for operating a second front sleeve relay 380.

An anti-sidetone balance is maintained in the operator's headset at all times. For example, before the operator may converse with the calling party, it is necessary to prepare the operator's circuit including various switching operations in the talking path and therefore it is necessary to switch terminations into and out of the circuit. For this purpose, master relay 310 operated in series with operator control relay 220 thereby closing contacts 314 to extend battery B301 over conductor TR, contacts K503, and conductor TO to pull operator termination relay 620. This relay opens contacts 622 thereby removing terminating resistance R605 from across conductors T and R. This resistance is utilized to provide a proper anti-sidetone balance in the operator's headset. At contacts 621, relay 620 also connects the MG and A leads together for forwarding a signal in the form of a ground marking from dial front key K401 to the EK lead via contacts K402*a*, K408*a*, conductor MG, contacts 621, conductors A and EK as a start signal to the key sender if one is provided. This same ground marking is placed on conductor KO via contacts 431 to signal the register controller circuit. A conversation circuit is now complete between the operator's headset and the calling subscriber so that the destination of the call may be determined. This conversation circuit may be traced as follows: From plug P200 over contacts K205 of ring rear key K207, conductor RR, contacts 216 and 222′, conductor ORR, operated contacts 373, conductor ORR′ and on to the operator's circuit by way of contacts on the refund rear, collect rear, and talk front keys. In the operator's circuit, the conversation path is completed to the operator's headset via conductor R, capacitor C602, contacts 635, induction coil R603, jack J604 and plug P605. The talking circuit returns to plug P200 over conductors parallel to the path just traced.

The operator speaks with the calling party and determines the directory number of the called party after which she inserts plug P208 into jack J209 and otherwise prepares to dial the called number. First, it is necessary to associate the dial circuit (Fig. 4) with the front cord attached to plug P208. For this purpose, dial front key K401 is operated to place a grounded (+) marking on conductor PUC, which extends from contacts K402 through contacts 452 and the winding of pick-up relay 440 to (−) battery. This pick-up relay operates and locks to conductor PUC at contacts 442. Contacts 444 close to complete a path between conductor ON and (−) battery by way of resistor R410. This prepares the trunk circuit for dialing over the circuit which will be from (−) battery through resistor R410, contacts 444, conductor ON, contacts 424, 415, and 237 to front tip FT, contacts of the ring front key, plug P208 and jack J209 to the trunk circuit in automatic equipment A210. Contacts 443 close thereby extending grounded (+) over conductor SW, contacts 451, and through the lower winding of switching relay 420 which operates to interconnect the dial and cord circuits. Contacts 443 also cause the operation of dial relay 460 and prepare a locking path for off-normal relay 470. Dial relay 460 closes contacts 461 thereby lighting dial pilot lamp L404. At contacts 462, dial relay 460 closed a circuit which may be traced from (—) battery through the winding of relay 470 for further preparing this relay. The operating circuit for relay 470 continues over operated contacts 462, conductor ON1 to open off-normal contacts K405 of the dial while the locking circuit for relay 470 continues by way of open contacts 473 and closed contacts 443. Dial front key K401 together with pick-up relay 440 completes a circuit to place a grounded (+) marking on conductor PUF for connecting the front cord circuit to extend dial pulses from the dial circuit to switch train A210. This marking may be traced from grounded (+) on contacts 443 and to conductor SW, contacts 451 and contacts 425, pick-up conductor PU, operated contacts K403 to conductor PUF which continues to the cord circuit and through operated contacts 223 to operate dial front relay 230. The resistance around relay 230 prevents damage by suppressing possible sparking. Relay 230 closes contacts 235 thereby extending front ring conductor FR to pulsing conductor PL while contacts 237 connect front tip FT to off-normal conductor ON. Dial front relay 230 completes a circuit for returning the grounded (+) marking on conductor PUF to the dial circuit by conductor H1 over a path which may be traced from conductor PUF over operated contacts 223 and 231 to hold conductor H1, contacts 418 and 428 to hold relay 450 and (—) battery. Relay 450 operates and opens its contacts 451 thereby removing the original marking ground which was extended over conductor PUF; however, dial front relay 230 continues to hold since contacts 454 close a circuit from conductor H1 to grounded (+) by way of contacts 463. It might be noted that contacts 454 are "X" contacts which close before other contacts open thus insuring the return of grounded (+) on conductor H1 before the removal of grounded (+) on conductor PUF. Relay 450 opens contacts 452 which is in the original operating circuit for pick-up relay 440; however, relay 440 is held operated by way of its own contacts 442 and conductor PUC which leads to a grounded (+) on operated contacts K402. A locking circuit is completed by way of contacts 463 and 454 to hold relay 450.

To review briefly, it may be recalled that dial front relay 230 is now operated, the dial circuit is individual to the cord circuit and is holding thereto under the influence of relays 450 and 460; therefore, the operator is ready to dial and there is no reason for her to remain connected to calling subscriber A. For example, if a keysender is used, the operator may key all necessary digits and then the sender may encounter a "stop dial" signal and hang for a short interval. During that interval, the operator may return talk key K202 to normal. This means that the rear cord circuit would appear as "open" and howl unless some sort of an idle line termination is provided. To avoid such an "open" condition, dial front relay 230 closes its contacts 233 and 234 thereby placing an idle line termination on the rear cord. This termination may be traced from the rear ring conductor RR through contacts 216, 223' and 234, capacitor-resistance network N209, contacts 233, 225' and 217 to the rear tip conductor RT. It should be noted that in case the operator returns the talk key to normal, relay 220 releases and therefore contacts 223' and 225' are closed. In case the operator has not returned talk key K202 to normal at this time, network N209 is still placed across the rear cord; although the termination is not necessary. This time the path may be traced from network N209 over contacts 233 and 234, 224' and 227', conductors OFR and OFT, contacts 383 and 385, contacts of refund and collect front keys, talk rear and talk front keys, refund and collect rear keys, contacts 373 and 375, conductors ORR and ORT, contacts 222' and 226', 216 and 217 to the rear cord.

Since the circuits are now in condition for the transmission of switch controlling signals, it is necessary to notify the operator that she may key or dial the called party's number; hence a circuit is closed for lighting start-stop lamp L403. This circuit may be traced from grounded (+) through contacts 316, 331, conductor FL1, contacts 229, 232, the SR conductor, contacts 411 and 426 to (—) battery by way of start-stop lamp L403 which lights.

It should be noted that a grounded (+) marking is now extended by way of contacts K408 on the wipe-out key, dial impulsing contacts K407 and the pulsing conductor PL, through operated contacts 422, rest contacts 413 and operated contacts 235 to the front ring conductor FR.

*Operator dials*

The operator may move the dial off normal preparatory to transmitting the first digit indication of the called party's number. In doing so, she closes contacts K405 which extends a grounded (+) marking over the off-normal conductor ON1 through contacts 462 and the winding of off-normal relay 470 to (—) battery. The resistance around relay 470 is for spark protection. Contacts 472 close a circuit for extending a (—) battery marking by way of resistance R410 to off-normal conductor ON in parallel with contacts 444. This is because relay 440 may release before the battery should be removed in some cases. Off-normal relay 470 also closes a pair of locking paths for itself one of which is by way of its contacts 473 and contacts 443 and the other of which is by way of contacts 471, conductor ON1 and contacts K405.

The operator releases the dial and it returns to normal transmitting suitable switch controlling signals in accordance with the dial setting. For example, in returning to normal, contacts K407 open and close alternately breaking and closing the pulsing path extending from grounded (+) by way of contacts K408 and K407 to the PL conductor and hence to front ring conductor FR. Therefore, a train of outgoing ground pulses is transmitted over conductor FR, plug P208 and jack J209 for operating a suitable switch train in automatic switching equipment A210. Subsequent digit indications may be transmitted similarly into the switch train of A210 for seizing called subscriber C.

*Restoration of circuits after dialing*

After the operator has dialed the last digit, she restores dial front key K401 thereby opening contacts K402, thus removing the grounded (+) marking from conductor PUC. It will be recalled that pick-up relay 440 has been holding over contacts 442 and conductor PUC; therefore this relay now releases and opens contacts 442, 443 and 444.

Automatic ringing may or may not be provided and therefore the operation which is to follow will be different depending upon its provision. First, it may be assumed that there is automatic ringing. After both the dial and the dial front key have been returned to normal, a circuit is completed from grounded (+) through contacts K406, the rear and front dial keys to conductor NG and the automatic ring control circuit which starts responsive thereto. Thus, it is seen that automatic ring will not begin unless both the dial and dial front key have been returned to normal. The automatic ring control circuit holds over conductor HD to grounded (+) at contacts 453. During this time a ground marking is returned over conductor LK from the automatic ring circuit to hold dial relay 460 and off-normal relay 470 operated during the transmission of the automatic ring signal. Hence, at contacts 472, relay 470 maintains resistance battery on conductor ON during transmission of the automatic ring signal. Following the transmission of a ring signal, grounded (+) is removed from conductor LK thus releasing relays 460 and 470.

If automatic ringing is not provided, relays 460 and 470 release responsive to the opening of contacts 443. This in turn causes contacts 461 to open thus extinguishing dial pilot lamp L404, contacts 462 and 471 open the ON1 conductor and contacts 473 further break a locking circuit to dial relay 460. The circuit for hold relay 450 is opened at contacts 463 responsive to the release of dial relay 460. Hold relay 450 remains operated briefly during an interval determined by its slow release characteristics following which contacts 453 open to remove the grounded (+) from conductor HD thus completely releasing the automatic ring circuit. Contacts 463 also remove the grounded (+) marking from hold conductor H1 to release dial front relay 230 having previously been held over the circuit including contacts 463 and 454, hold conductor H1, contacts 428, 418 and 231 to (−) battery by way of the winding of relay 230 which releases. When dial front relay 230 restores, idle line termination N209 is removed from across the rear cord circuit.

Means is provided to prevent the possible association of the dial circuit with two or more cord circuits. For example, it will be recalled that to associate the dial circuit with any cord circuit, it is necessary to operate either the dial rear or dial front key thus forwarding a grounded (+) marking over conductor PUC for operating relay 440 via contacts 452. If the dial circuit is not yet released, hold relay 450 is held operated (as explained above in this section) holding contacts 452 open thus preventing operation of pick-up relay 440. Furthermore, relay 450 is made slow release so that contacts 452 will not reclose until the dial circuit and the cord circuit have had time to be completely disassociated.

The operator may disassociate her equipment at any time after the dial front key is operated. For example, it has already been pointed out how network N209 is connected if she previously restored talk key K202. Assume first that she has returned the talk key to normal and promptly thereafter operated a talk key in a second cord circuit before the dial circuit is disassociated from the first cord circuit—for example, the dial circuit could be held briefly either by an automatic ring circuit or by a stop dial signal which causes delay in dialing. There is no danger that the dial circuit may be extended to the second cord circuit because it is necessary for contacts 451 to be closed before either a dial front or a dial rear relay (such as relays 230 and 210) may be operated in a second circuit. Assuming, however, that she did not restore her talk key previously, she will restore it now, thereby opening contacts K204 over which operator control relay 220 has been holding. Relay 220 releases and the circuit restores to normal with the talking path completed from rear to front cord over the circuit including conductors RT and RR, contacts 216 and 217, 223′ and 225′, 236 and 238, conductors FT and FR, to plug 208.

Anti-sidetone balance is also maintained during release of the equipment. That is, returning talk key K202 to normal opens the path to master relay 310 which releases. Contacts 315 open the path to relay 320; however, this relay continues to hold briefly during the interval determined by its slow release characteristics. This delay is to prevent contacts 322 from closing a circuit to a second operator control relay before relay 220 has had time to release. Otherwise, there would be a possibility that two cord circuits may be simultaneously connected together thus mingling two conversations. Contacts 314 open the path over which operator termination relay 620 is holding to release this relay and shunt the talking conductors with resistance R605 thereby returning the proper balance for anti-sidetone purposes.

Assuming that automatic ringing is not provided, the operator may now actuate her ring front key, signaling the called party. Since this function breaks the talking path, it is necessary to place an idle line termination on the rear cord to prevent howling. The termination is by way of rear tip conductor RT, front tip conductor FT, through operated contacts K211 of the ring front key to conductor ST through network N210 and back over conductor ST1 to operated contacts K213, and ring conductors FR and RR. Operation of the ring front key also forwards a signal for initiating ringing. This signal is by way of a circuit which may be traced from plug P208 to contacts K212 and conductor SB to resistance battery B212.

*Monitoring*

The operator may desire to monitor the call at some later time in which case she operates her monitor key K213 which forwards a grounded (+) marking through contacts K214, conductor M, contacts 311 and conductor MO to monitor relay 630 which operates and closes its contacts 632 and 634, thereby completing a circuit from the operator's headset through plug P605, jack J604, cable 18, contacts 632 and 634, repeat coil R604, contacts 613 and 615 to conductors T–1 and R–1 and contacts K215 and K216, conductors MT and MR to rear ring and tip conductors RT and RR. At this time the operator may listen since the receiver of her headset is connected by way of the sleeve contacts of plug P605 and jack J604; however, she may not talk since the talking path is open at contacts 635 and 636.

*Supervision*

Supervisory lamp L217 is provided for informing the operator as to the progress of the call. More specifically, plug P208 is initially interconnected with jack J209 and a circuit is completed for operating sleeve relay 240 over a path which may be traced from grounded (+) through high resistance R214, the winding of relay 240, jack J209, plug P208, front sleeve FS, contacts 221′ and conductor FS1 to (−) battery by way of the windings of relays 330 and 340. Relay 330 does not operate since it is marginal and thus won't respond if high resistance R214 is in the circuit. Sleeve relay 240 operates to close contacts 241. This sends a direct ground marking to relay 330 which then operates because the closing of contacts 241 shunts resistance R214. Following this, contacts 331 close and a circuit is completed for lighting supervisory lamp L217 as an on-hook signal. The circuit is via contacts 316 and 331, conductor FL1, contacts 229, conductor FL and lamp L217.

When subscriber "C" answers, contacts K245 are opened by any suitable means (not shown) to remove the direct ground from conductor FS thereby returning it to ground by way of high resistance R214. This causes marginal relay 330 to release opening contacts 331 to extinguish lamp L217 which the operator notes as off-hook supervision.

On-hook supervision returns when contacts K245 close responsive to C's hanging up at which time marginal relay 330 reoperates to close contacts 331 for lighting lamp L217.

The foregoing explanation assumes that the operator has talk key K202 thrown to pull operator control relay 220 thereby closing contacts 229 and 221′; however, the talk key need not be thrown since means is also provided for extending operator's supervision when the talk key is normal. In this condition, off-hook supervision is extended through the front cord circuit in the form of a grounded (+) marking connected by way of high resistance R214 to conductor FS by way of jack J209 and plug P208 and through contacts 228 (both the talk key and operator control relay 220 being released) to conductor FL and supervisory lamp L217. The high resistance of element R214 is sufficient to keep lamp L217 from lighting. For on-hook supervision, low resistance ground is forwarded via contacts K245 and 241, the lower winding of relay 240, over the FS and FL leads, by way of contacts 228 thereby lighting lamp L217.

*Operator answer via front cord*

If the operator should have answered the call by inserting plug P208 into jack J201 and should have forwarded the call by connecting plug P200 with jack J209, the circuit would function similarly to that described above except that ring rear key K207 would have been operated instead of the ring front key and in like manner the dial rear relay 210 would have operated instead of the dial front relay 230. Similarly, the functions of the front and rear sleeve relays 330—380 would have been reversed.

*Keysender*

On occasions, this circuit may be used with a keysender of the type shown by my above identified copending application in which case provision is made in Figs. 4 and 6 for connecting to a sender; furthermore, on occasions, two keysenders may be used alternately. In this event, switching relay 410 may be operated to switch the various control conductors from one sender to the other sender. That is, relay 410 operates over the SW conductor which is extended through contacts 221 of the operator control relay 220 to conductor SS which in turn is marked from a register control circuit, not shown. The sequence of switching between the senders may be controlled by any suitable means (not shown) in the register control circuit by the manner in which that means marks conductor SS.

*Cord splitting*

Very often an operator has a party on each cord, i. e., the front cord and the rear cord, and she desires to converse with one party without the other party hearing the conversation. To accomplish this, she resorts to what is known in the art as "cord splitting." That is, she operates the talk key such as K202 associated with the particular cord circuit used in the call and also she operates suitable contact means such as either the talk rear key or talk front key in Fig. 5 depending upon the particular party to whom she wishes to speak.

Let it be assumed that she wishes to converse over the rear cord. In this case, keys K202 and K510 are operated. Key K202 operates relay 220 to forward a resistance ground from the RS and FS conductors and through contacts 227 and 221' for operating relays 360 and 340. More specifically, front sleeve relay 340 operates from (—) battery through the windings of relays 340 and 330 over conductor FS1, through contacts 221' to the front sleeve conductor FS, and grounded (+) by way of high resistance R214. Rear sleeve relay 360 operates over a similar circuit extending through the windings of relays 360 and 350 over conductor RS1, and contacts 227, to grounded (+) by way of a resistance (not shown) similar to R214. The talk key also closes a circuit for operating master relay 310. Relay 340 closes contacts 341 thereby operating front sleeve relay 380 while relay 360 closes contacts 361, thereby operating relay 370. Relay 380 completes a circuit placing an idle termination on the front cord, the path being traced from conductors OFR and OFT through contacts 383 and 385, normal contacts on the refund and collect front keys and through operated contacts K511 and K512 to terminating network N512. Relay 370 forwards a resistance battery marking from B301, over contacts 314, conductor TR, contacts 371, K503 and conductor TO to operate relay 620, the resistance around this relay being for spark protection. Contacts 373 and 375 close to complete a talking path from the rear cord circuit to the operator's circuit in Fig. 6. Relay 620 opens contacts 622 thereby removing resistance R605 from across conductors T and R, for the operator is receiving her anti-sidetone balance from the subscriber's connection. A conversation may follow and subscriber C, connected by way of the front cord, cannot hear since his circuit is now open at contacts K513 and K514 while a conversation circuit to the rear cord is completed by way of contacts 373 and 375, conductors ORR' and ORT', through contacts of the refund and collect rear keys, contacts K501 and K502 and on to the talking circuit of Fig. 6 via conductors T and R.

If the operator should wish to converse with subscriber C by way of the front cord, she operates talk key K202 and front talk key K516. The circuit functions similarly to that described above in connection with the operation of talk rear key K510.

Anti-sidetone balance is also provided when the operator resorts to cord splitting where only one cord is plugged-in as is indicated by a suitable switching means such as the front and rear sleeve relays, for example. To illustrate, such a call may be where she has a party on the front plug and wishes to converse with the chief operator's desk via conductors CR and CT. In this case the talk rear key is operated to cut-off the front party in a manner just explained. Since the rear cord is not plugged-in, conductor RS is open and relays 360 and 370 are not operated. This means that contacts 371 are open; hence, when the talk rear key is operated, relay 620 releases thus closing contacts 622 to put resistance R605 back across the line to maintain anti-sidetone balance. It may be recalled that before the operation of the talk rear key a circuit was closed for operating relay 620 via the path including relay 620, conductor TO, the lowermost rest contact on the talk rear key, conductor TF, contacts 381, conductor TR to (—) battery B301 by way of contact 314 and resistor R302, contacts 381 having been closed as a result of the operation of relay 380 from contacts 341 which in turn was closed via conductors FS1 and FS when front plug P208 was connected with jack J209.

*Coin control*

Means is provided in the position circuit of Fig. 5 for controlling coin collect or refund, as required, in case one of the subscribers is at a paystation. For example, let it be assumed that it is necessary to collect a coin at station A. The operator moves the collect rear key. Operation of the collect rear key closes contacts K507, thereby completing a circuit to coin control relay 530. More specifically, a circuit extends from (—) battery through the winding of coin control relay 530, and operated contacts K507 of collect rear key to conductor ORR', contacts 373, conductor ORR, contacts 222' and 216, conductor RR, contacts K205, plug P200 and jack J201 and to telephone equipment A209 and a ground connected relay. Relay 530 is made slow to operate thereby delaying the application of collecting current for a brief instant until all subsequent equipment has had time to operate. After an interval marked by the slow-to-operate characteristic of relay 530, contacts 531 close extending the collect potential 110 v. positive to operated contacts K506 and out over the tip side of the line to the trunk and thence over both sides of the line to the paystation where the collect magnet is operated. Relay 520 operates in series with the collect magnet to close contacts 521 thereby lighting collect lamp L516. The operator may check to determine whether the coin has been collected by restoring and reoperating the collect rear key. If the coin is stuck in the hopper, relay 520 again operates to light lamp L516. On the other hand, if the coin has been collected, relay 520 will not operate and lamp L516 will not light. When a coin sticks, the collect magnet at station A may be jiggled in any suitable manner such as by repeated operation of the collect rear key or by an interrupter. If no coin had been deposited, the series circuit between relay 520 and the collect magnet at the calling substation would not have been complete; hence relay 520 would not operate and lamp L516 would not light.

If the operator wished to refund a coin on the rear cord, she would have operated the "refund rear" key. On the other hand, if she wished to control coins over the front cord, she would have operated either the refund front or collect front key. In any event, the operation would be similar to that described above in connection with collect rear key.

*Simultaneous connections of cord circuits*

Means is provided for interlocking the cord circuits so that there is no chance that two conversations will accidentally be interconnected by means of common equipment. Fig. 8 is useful for explaining this feature. This figure shows, in disconnected form, relays 820 and 840 which may be identical with relays 220 and 310 respectively. Relay 830 corresponds to relay 320 while talk key K802 corresponds to key K202. The relays of Fig. 8 are shown as having contacts which are similar to some of the contacts on corresponding relays in Figs. 2 and 3. Relay 810 and talk key K801 are duplicates of those found in the second cord circuits. For example, the first cord circuit may be element 21 in Fig. 1 and the second cord circuit may be element 20.

First let it be assumed that the two talk keys, K801 and K802, are operated simultaneously. One circuit extends from grounded (+) through the operate or low resistance winding of relay 810, contacts K805, 832 and 813 to (—) battery B801 by way of resistance R802. A second similar circuit extends through the low resistance winding of relay 820, contacts K803, 832 and 813 to (—) battery B801 by way of resistance R802. The resistance of element R802 and of the low resistance windings of relays 810 and 820 is such that neither relay will operate.

Now let it be assumed that talk key K802 is operated alone. Relay 820 half-operates from battery B801 due to the resistance value of element R802 to attract contacts 822 which completely energizes relay 820 from (—) battery over its lock or high resistance winding, contacts 822, K804 and the winding of relay 840 to grounded (+). Relay 840 opens contacts 813. If key K801 is now operated, the circuit through the low resistance winding of relay 810 and contacts K805 is open at contacts 832 and 813, relay 830 having operated when relay 840 closed contacts 815.

Means is provided for preventing undue noise when talk key K802 is opened to release relays 820 and 840. For example, assume that both talk keys K801 and K802 are operated and that key K802 is opened. It might be possible that relay 810 would operate during the interval required for relay 820 to release. This would momentarily connect the talking conductors of the first and second cord circuits. While this interval is too short to hear conversation, it may be long enough to transmit an unpleasant noise. To forestall such operation relay 830 is made slow-to-release, thereby holding contacts 832 open long enough to insure the complete release of relay 820 before the operation of relay 810.

One final feature is the relation between the windings of relays 820 and 840. The buildup time during which the coils of relays 820 and 840 are energized must be such that an inductive kick is prevented in relay 820. If this were not so, relay 820 would act as a transformer and a current might be induced in the low resistance winding of relay 820 during the energization of its high resistance winding. If talk key K801 were thrown at that time, this inductive kick would extend over contacts K803 and K805 to pull relay 810. This feature is accomplished by increasing the inductiveness of relay 840 which slows the buildup time in relay 820.

However important it is to prevent the connection of two cord circuits simultaneously, there are times when an operator may wish to perform a deliberate operation and exercise an option to interconnect two cord circuits. In this case, she will operate the talk key in one cord circuit and the monitor key of another cord circuit. The talk key operates master relay 310 to forward resistance battery B301 over contacts 314 to operate relay 620. While the monitor key in another cord circuit forwards a grounded (+) marking through contacts corresponding to K214, conductor M and contacts 312 (which were operated when the talk key in the first circuit pulled relay 310) to the TK conductor, thereby operating transfer relay 610. This relay transfers conductors T–1 and R–1 from repeat coil R604 to inductance coil R603 at contacts 614 and 616. Conductors T–1 and R–1 extend to the monitor key in the second cord circuit, conductors MT and MR to the talking pair of the second cord circuit. Conversation may follow between the operator and/or parties on either cord circuit. When the monitor key is restored, ground is removed from conductor TK thereby releasing relay 610 to return conductors T–1 and R–1 to their normal connection with repeat coil R604. When the talk key in the second cord circuit is restored to normal, the equipment releases as explained above in the section headed "Restoration after dialing."

*Busy test and out of order tone*

The operator may wish to make a busy test by either her front or rear cord. In either case, she touches the tip of plug P200 or plug P208, as the case may be, to the sleeve terminal of the associated jack. If the line is busy, a (—) battery marking is extended over the associated tip conductor from the sleeve relay of supervisory lamp of another cord circuit at another operator position (not shown) to contacts 376 or 386 depending upon which cord was used. From this point, the (—) battery marking is extended over the BT conductor to operate busy test relay 670. This relay closes contacts 671 thereby completing a circuit to the test winding of inductance coil R603, thus charging capacitor C604 to produce an inductive kick which the operator hears as a click in the receiver of headset 16. If an out-of-order condition exists, a special tone signal is on the sleeve of the tested jack and the operator is able to hear tone by way of capacitor C605.

The other cord circuit (to which reference is made in the immediately preceding paragraph) is similar in detail to that shown in Fig. 2. Since a plug corresponding to P208 is inserted in a jack corresponding to jack J209, the (—) battery busy marking referred to in the immediately preceding paragraph is extended to jack J209 because all operator jacks are wired in parallel. If the talk key in the other cord circuit is thrown, the busy marking extends through the windings of front sleeve relays corresponding to 330 and 340 to a conductor similar to FS1 over operated contacts 221' and conductor FS to the sleeve of jack J209. If the talk key in the other cord circuit corresponding to key K202 is released when the busy test is made, the marking battery in the other cord circuit comes from through the filament of the lamp corresponding to L217 and in parallel therewith from an unnumbered resistor over a conductor corresponding to FL and contacts similar to 228 to the sleeve of jack J209 by way of a front sleeve conductor like FS. The unnumbered resistor insures battery even though lamp L217 burns out. If the tested line is not busy, a ground (+) marking is extended through resistor R214 and busy relay 670 does not operate.

*Pad control*

Retard coil R607 is used to extend a characteristic marking over conductors T and R to certain trunk circuits which may require a special signal to operate a pad control relay.

*Chief operator monitor*

Means is provided whereby the chief operator may monitor an operator without regard to the operator's actions; furthermore the chief operator is constantly apprised of the fact that the operator either is or is not monitoring a call as well as the fact that the operator has taken position.

It might be recalled that when the operator took position by plugging in her headset 16, a circuit was completed for operating operator battery relay 640 which in turn closed contacts 644 to transmit a signal to the chief operator's desk via conductor PR.

First, let it be assumed that the operator is monitoring according to the procedure set forth above in the section entitled "Monitoring." To do this, she operates monitor relay 630 which closes contacts 638 and 631'. The chief operator's desk is now connected to repeat coil R604 whereby the chief operator may listen in on the operator's conversation. At contacts 637 a circuit is closed for lighting a supervision lamp (not shown) at the chief operator's desk apprising her of the fact that the operator is monitoring a call.

Next, let it be assumed that the operator is not monitoring the call; however, she is connected with a subscriber because a talk key is thrown in one of the cord circuits. In this case, monitor relay 630 is not operated and therefore the chief operator may listen in over the path extending over conductors CR and CT, contacts 639 and 632' to the secondary winding of induction coil R630. In this case, contact 637 is open so that the supervision lamp (not shown) at the chief operator's desk is not lit so that the chief operator is aware of the fact that the operator is not monitoring a call.

The foregoing explanation is by way of example only and is drawn to illustrate the invention and not to show all possible combinations utilizing the invention; therefore my intention is that the following claims should cover not only the specific embodiment shown in the accompanying drawings and described above, but also these claims should cover those modifications which may be apparent to person skilled in the art.

What I claim is:

1. In a telephone system, an operator's position comprising a cord circuit including a front and a rear sleeve conductor, an operator's headset and an operator's circuit, a position circuit accessible to said cord circuit, said operator's circuit comprising a talking path including a two winding induction coil for connecting said headset with said position circuit, means for balancing said induction coil to avoid sidetone in said operator's headset, control means for switching said anti-sidetone balancing means into and out of said talking path and means for operating said control means depending upon the marking extended over at least one of said sleeve conductors to said position circuit.

2. The device of claim 1 in which said cord circuit comprises a front circuit and a rear circuit either or both of which may be included in said talking path, a first and a second switching means, means for operating said first switching means via said rear sleeve conductor when said rear circuit is connected to an associated circuit, means for operating said second switching means via said front sleeve conductor when said front circuit is connected with an associated circuit, and other circuit means effective upon the operation of either said first or said second switching means for operating said control means, said anti-sidetone balancing means consisting of a resistor.

3. The device of claim 2 and contact means for disconnecting said talking path from either said front or said rear circuit, a terminating network and means for connecting said terminating network to that one of said circuits from which the talking path is disconnected.

4. The device of claim 3 in which said contact means includes means for causing said control means to switch said anti-sidetone balance means into said talking path when one of said switching means, corresponding to that one of said circuits to which said talking path is still connected, is not operated.

5. A toll board comprising a plurality of cord circuits and other circuits common thereto, means for connecting one of said cord circuits with said common circuits, interlock means for preventing the simultaneous connection of a plurality of said cord circuits with said common circuits, said interlock means comprising a relay in each of said cord circuits and a master relay in said common circuits, means for operating said master relay when only one of said cord circuits is connected with said common circuit and circuit means controlled by the operation of said master relay for disabling said relays in each of said cord circuits except for the relay in said one cord circuit.

6. The device of claim 5 in which each of said cord circuit relays includes an operate winding, means for connecting said operate windings in parallel and for connecting said parallel circuits in series with a contact on said master relay and means for individually closing each of said parallel circuits, each of said operate windings being of such low resistance that none of said relays will operate if more than one of said parallel circuits are closed simultaneously.

7. The device of claim 6 and means for half-operating one of said relays over its operate winding when only that one of said parallel circuits with which it is associated is closed, contact means controlled by said half-operated one relay, a lock winding on said one relay, means including said contact means for connecting said lock winding in series with said master relay whereby said one relay locks and said master relay operates to open its said contact thereby opening all of said parallel circuits to all of said operate windings.

8. The device of claim 7 and a time delay device operated by said master relay, other contact means controlled by said time delay device and included in the said series circuit extending from said parallel circuits to said contact on said master relay, means for opening said series circuit thereby releasing said master relay and opening its contact, means completed by the release of said master relay for operating said time delay device thereby measuring a brief interval of time, said other contacts controlled by said time measuring device being held open during said brief interval of time and closed thereafter whereby after said interval said series circuit is again prepared to complete one of said parallel paths.

9. An operator's toll board including a plurality of telephone lines terminated thereat, a plurality of cord circuits each of which may be made individual to any of said lines, other circuits common to said plurality of cord circuits, first means operated to a first position for rendering any of said cord circuits individual to at least one of said common circuits and holding means in said one common circuit for maintaining said individual connection between it and said cord circuit independently of said first means, whereby said operator may return said first means from said first position at any time without releasing said individual connection.

10. The device of claim 9 in which said individual cord circuit includes means for completing a circuit for the transmission of control signals to an automatic switch train.

11. The device of claim 10 in which each of said cord circuits includes a tip and a ring conductor, circuit means for connecting said signal transmission means to transmit said switch directing signals over said ring conductor and other circuit means for connecting said one common circuit to transmit supervisory signals over said tip conductor.

12. An operator's toll board comprising a plurality of cord circuits and a dial circuit common thereto, means for individually connecting said dial circuit with one of said cord circuits, holding means for locking said dial circuit in said connection and circuit means controlled by said locking for preventing the simultaneous connection of two or more of said cord circuits with said dial circuits.

13. The device of claim 12 in which said holding means comprises a slow release relay, a dial including off-normal springs and a contact device, circuit means including said dial off-normal springs and said contact device for locking said slow release relay operated and means for releasing said relay only when both said off-normal springs and said contact device are in normal position.

14. In a telephone system, an operator toll board comprising a plurality of cord circuits, a position circuit and an operator's circuit including an operator's headset, a chief operator's position, means responsive to connection of said headset to said operator's circuit for transmitting a supervisory signal to said position for apprising said chief operator of the fact that the toll board operator has taken position, means at said toll board for monitoring any of said cord circuits, means for transmitting a supervisory signal to said position for apprising said chief operator of the fact that the toll operator is monitoring a call and means whereby said chief operator may be operatively connected to said toll board at any time for observing the conduct of the toll operator.

15. In a telephone system, a toll switchboard comprising a plurality of cord circuits, common circuits, means in each of said cord circuits comprising a talk key and a two winding operator control relay for connecting one cord circuit to said common circuit, one of said two windings being of a high resistance and the other of said two windings being of a low resistance, a given potential to which the low resistance winding on each of said operator control relays is connectable by means of the talk key in the corresponding cord circuit, means responsive to the operation of one of said talk keys in a particular cord circuit for connecting said low resistance winding of one of said operator control relays in said particular cord circuit to said given potential to operate said operator control relay, said low resistance winding being of such value that two operator control relays may not be operated simultaneously, a master relay, means responsive to said operation of said one operator control relay for connecting said high resistance winding of said one operator control relay in series with said master relay whereby said one operator control relay locks in an operated position and said master relay operates, and means responsive to operation of said master relay for opening said circuit from said given potential to said low resistance windings of said operator control relays in each of said cord circuits.

16. The device of claim 15 and a slow release slave relay, means responsive to operation of said master relay for operating said slave relay, means responsive to operation of said slave relay for opening a second point in said circuit from said given potential to said low resistance windings, and means responsive to restoration of said talk key for opening said circuit connecting said high resistance winding and said master relay in series.

17. The telephone system of claim 15 wherein the relative inductive reactances of said high resistance winding and the winding of said master relay is such that the inductiveness of said master relay winding is of sufficient magnitude to slow the build-up time of the induction field of said high resistance winding of said operator control relay thereby preventing an inductive kick through the low resistance winding of said operator control relay.

References Cited in the file of this patent

UNITED STATES PATENTS

| | | |
|---|---|---|
| 1,718,301 | Nelson | June 25, 1929 |
| 2,083,404 | Saul | June 8, 1937 |